United States Patent [19]
Schwartz et al.

[11] 3,980,256
[45] Sept. 14, 1976

[54] TAPE CASSETTE

[75] Inventors: Vernon R. Schwartz, Cupertino; Roger N. J. Tregear, San Jose, both of Calif.

[73] Assignee: Information Terminals Corporation, Sunnyvale, Calif.

[22] Filed: Nov. 8, 1974

[21] Appl. No.: 522,074

Related U.S. Application Data
[62] Division of Ser. No. 276,633, July 31, 1972.

[52] U.S. Cl. .................. 242/199; 220/4 E
[51] Int. Cl.² .............. G03B 1/04; G11B 15/32; G11B 23/04
[58] Field of Search .................. 242/197–200, 242/74; 220/4 E, 327; 226/189, 190, 194; 352/72–78 R; 360/92–96

[56] References Cited
UNITED STATES PATENTS

| | | | |
|---|---|---|---|
| 3,360,152 | 12/1967 | Leers | 220/4 E |
| 3,561,851 | 2/1971 | Martin | 352/78 R |
| 3,642,229 | 2/1972 | Downey | 242/199 |
| 3,648,952 | 3/1972 | Bundschuh | 242/197 |
| 3,655,145 | 4/1972 | Olsen | 242/197 |
| 3,661,345 | 5/1972 | Ritz | 242/199 |
| 3,712,557 | 1/1973 | Stenzenberger et al. | 242/197 |

Primary Examiner—Leonard D. Christian
Attorney, Agent, or Firm—Townsend and Townsend

[57] ABSTRACT

An improved, Philips-type tape cassette having a shiftable tab for selectively blocking the opening formed by the removal of the conventional knock-out tab used to provide a means for determining the presence of pre-recorded material on the tape carried by the cassette. The two shells of the cassette have improved tongue and groove structure at the adjacent sides and ends to fit the shells together and to prevent relative movement therebetween. Relatively wide front and rear end walls on one of the shells provide a pair of beams of increased thickness to prevent bending of the cassette so as to maintain its structural integrity. An improved internal lock is provided near the central part of the rear wall where an attachment screw would be impractical. Each hub of the cassette has an improved leader-holding insert which is received within an outer peripheral recess and supports the tape across the recess to avoid "spoking" in the tape pack formed on the hub. Each of a pair of improved idler posts integral with one of the shells provides a pair of spaced, cylindrical bearing surfaces while providing a space for receiving lubricant. Tape guides near the open, tape-exposing extremity of the cassette are perpendicular to the inner surface of each shell to minimize the "barber pole" effect on the tape.

10 Claims, 15 Drawing Figures

FIG. 4
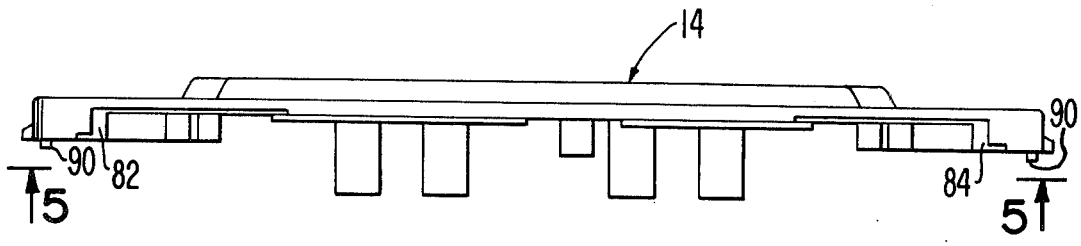
FIG. 5
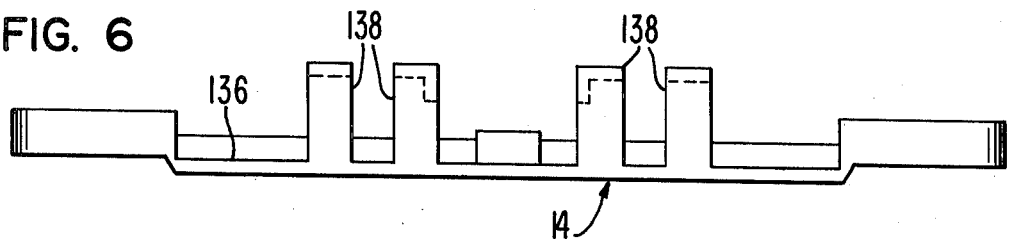
FIG. 6
FIG. 7
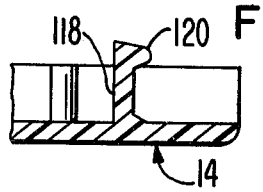

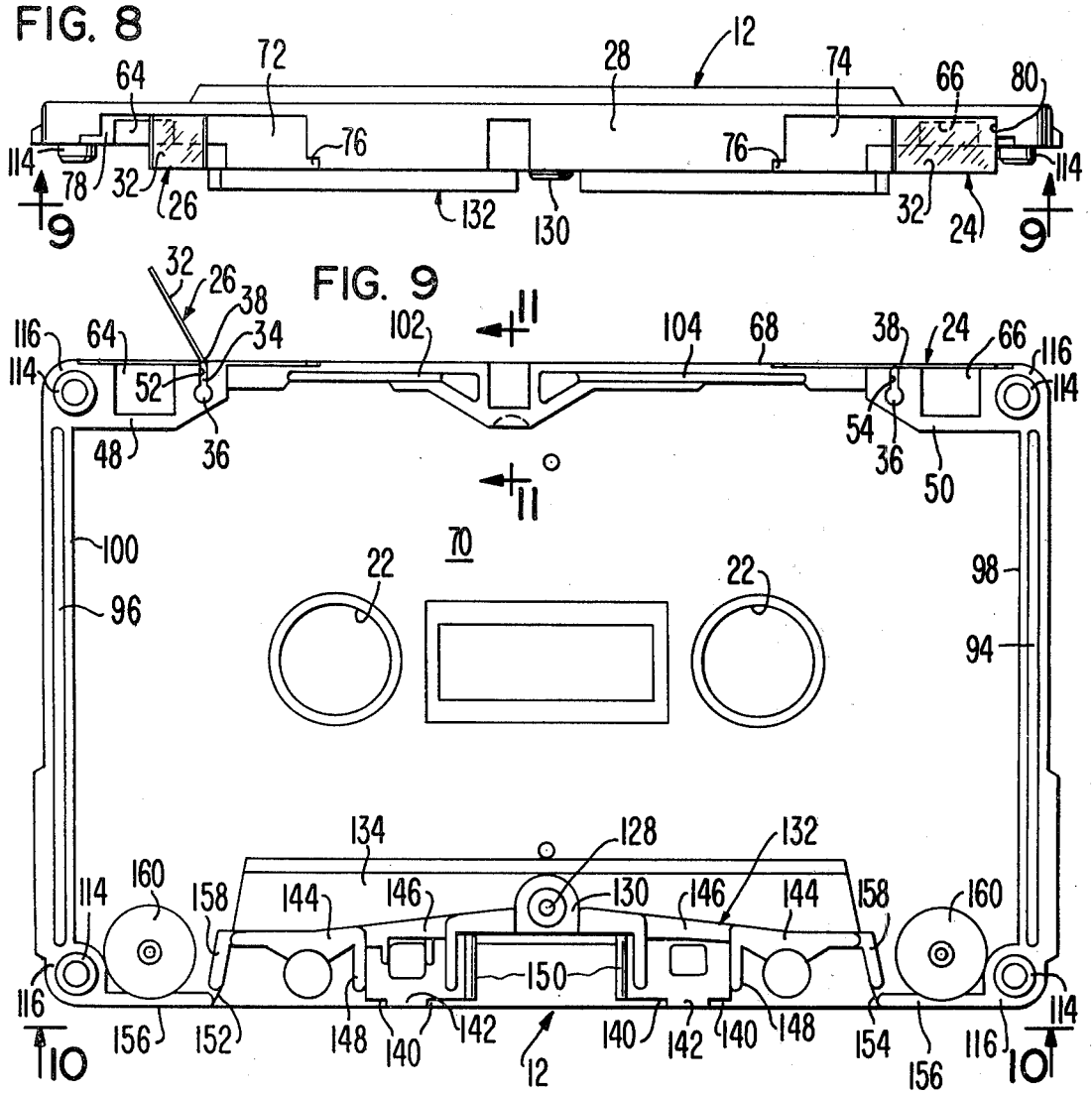

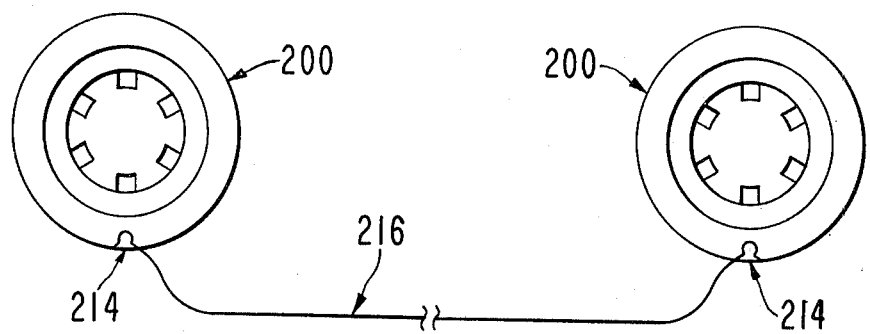
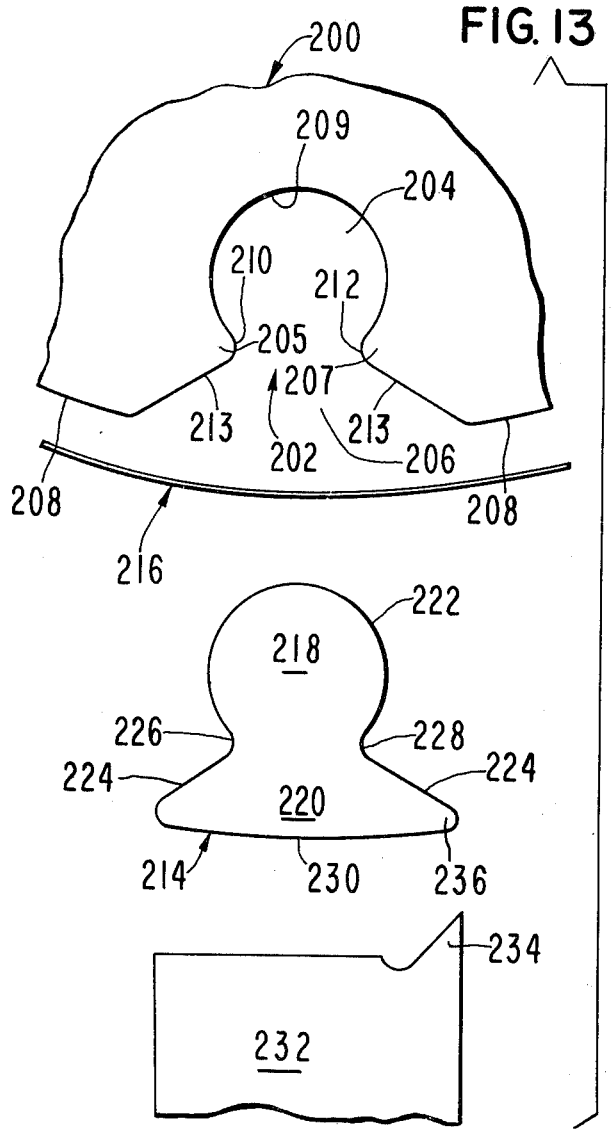
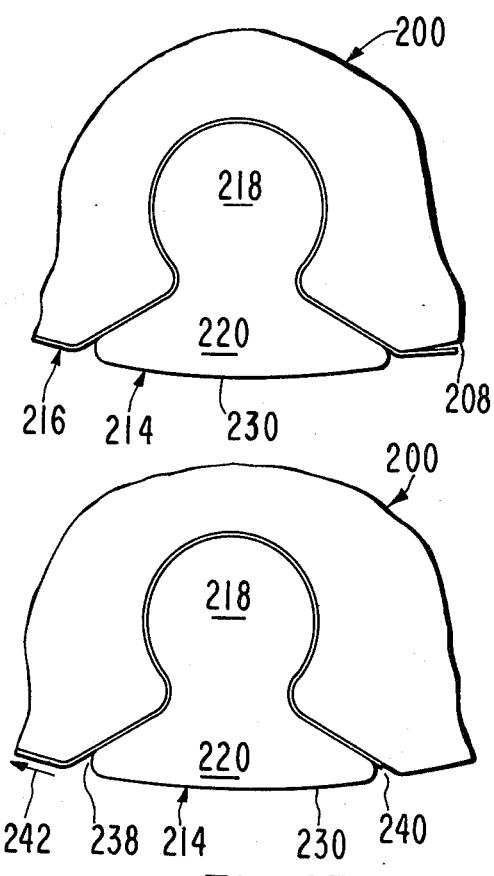

TAPE CASSETTE

This is a division of application Ser. No. 276,633, filed July 31, 1972.

This invention relates to improvements in Philips-type tape cassettes and, more particularly, to a tape cassette having improved mechanical stability.

In utilizing tape cassettes of the Philips-type for the precision recording and playback of information, such as digital or audio information, it is extremely important that the cassette be mechanically stable so that it will not warp with use or with age. Moreover, it must not change dimension or shape or otherwise undergo physical changes when subjected to being roughly placed in or removed from a tape transport. It must at all times be able to present the tape so that the latter will be properly positioned with respect to a read-write head of the tape transport. Conventional Philips cassettes generally are not stiff enough and are not designed to meet the foregoing criteria. As a result, the conventional cassettes are not suitable for precision recording and playback work especially when interchangeability between the transport and multiple playback of recorded information in the cassette are important.

The present invention is directed to a Philips-type tape cassette having a number of improvements which cause the cassette to have a much greater mechanical stability than conventional Philips cassettes. Thus, the cassette of this invention is especially suitable for precision recording and playback of digital, audio and other information, yet the cassette is simple in construction and can be produced in volume at minimum expense. Because of its improved construction, the cassette of this invention is more positively interchangeable with different tape transports than is possible with conventional cassettes.

The cassette can also be made in a manner such that it can have a pair of shiftable tabs on the normally rear end wall for selectively opening or closing the holes initially closed by conventional knock-out tabs integral with the cassette, the tabs being removed if the tape of the cassette is pre-recorded. However, it is oftentimes desirable to be able to record on tape in a cassette whose knock-out tabs have previously been removed. The shiftable tabs of the present invention are capable of selectively covering the holes formed by removal of the knockout tabs, yet the tabs of the invention can be moved to standby positions while still being carried by the rear wall of the cassette; thus, they are never separated from the cassette, once the latter is assembled.

An important improvement with respect to enhancing the mechanical stability of the cassette is the use of tongue and groove structure at the opposed sides at one end of the cassette to provide a more positive fit between the two shells of the cassette yet prevent any relative movement of the cassette shells after assembly. To this end, one of the shells has side and end ribs which are complementally receivable within corresponding grooves in the sides and one end of the other shell. The ribs are capable of being snapped into the grooves inasmuch as the material of the shells can be somewhat resilient for this purpose, the resilience being sufficient to provide a releasable lock so as to keep the shells in fixed positions relative to each other.

Another improvement relating to mechanical stability of the cassette is the use of an additional releasable lock near the rear wall thereof in a region where an attachment screw would be most impracticable because the tape pack prevents the inclusion of mounting structure for such a screw. Such lock includes a post on one of the shells with the post having a lateral projection which snaps into a recess near the rear wall of the other shell. Thus, the central part of the cassette near the rear wall is sufficiently locked together to prevent any tendency for the shells to separate from each other or bend relative to each other in this region so as to maintain the structural integrity of the cassette.

A further improvement directed to improved mechanical stability is the provision of front and rear end walls of increased width and thickness on one of the shells to present a pair of beams of increased strength to prevent side bending of this cassette and thereby distortion of the tape path therethrough. Such beam thickness is twice that of conventional Phillips-type tape cassettes and provides greatly increased stiffness for the cassette. As a result, this feature represents a vast improvement over conventional cassettes which are relatively flexible.

The tape cassette of this invention also has a pair of improved idler posts which are integral with one of the shells and are constructed to orient the idler pulleys thereon in a manner to assure that the tape will at all times move along a predetermined path past the open, tape-exposing front face of the cassette. The posts also have a taper which allows them to be readily removed from a mold yet each post has two, cylindrical, spaced bearing surfaces for the corresponding idler pulley so that its axis will be sufficiently stable to cause the tape to follow the desired path. In addition, the configuration of the post defines a space within the pulley for receiving a lubricant, if desired, whereby the friction between the post and pulley can be minimized.

Another improvement of the present invention relates to the hubs for the cassette wherein each hub has an improved leader locking means at its outer periphery. The locking means includes an insert receivable within a recess in the outer periphery of the hub to hold the adjacent end of a leader to the hub. The outer surface of the insert is a substantial continuation of the outer periphery of the hub so that tape pack defects, such as "spoking" will not occur as the tape pack builds up on the hub.

The primary object of this invention is to provide a tape cassette of the Philips-type having a number of improvements which greatly increase the mechanical stability of the cassette so as to render the latter especially suitable for use where precision recording and playback of information is desired or necessary.

Another object of the present invention is to provide a Philips-type tape cassette having structural improvements which increase its stiffness and render it more suitable for interchangeablility while assuring that the structural integrity of the cassette will be maintained after long periods of use with different types of tape transports.

A further object of this invention is to provide a Philips-type cassette having an improved tab shiftably mounted thereon for movement into and out of blocking relationship to the hole formed by removal of the knock-out tab of the cassette so that the hole can be selectively opened or closed after removal of the knock-out tab.

Another object of this invention is to provide a hub for a Philips type cassette wherein the hub has an improved leader lock at its outer periphery to positively hold the end of a leader coupled to the hub; the tape pack formed on the hub will not have defects in it, such as occurs with hubs having conventional leader locks.

Other objects of this invention will become apparent as the following specification progresses, reference being had to the accompanying drawings for an illustration of the invention.

In the drawings:

FIG. 4 is a rear end elevational view of one sidewall of the cassette;

FIG. 5 is a plan view of the sidewall of FIG. 4, looking in the direction of line 5—5 of FIG. 4;

FIG. 6 is a front end elevational view of the sidewall of FIGS. 4 and 5;

FIG. 7 is an enlarged, cross-sectional view taken along line 7—7 of FIG. 5;

FIG. 8 is a rear end elevational view of the other sidewall of the cassette;

FIG. 9 is a plan view of the sidewall of FIG. 8, looking in the direction of line 9—9 of FIG. 8;

FIG. 10 is a front end elevational view of the sidewall of FIGS. 8 and 9;

FIG. 11 is an enlarged, cross-sectional view taken along line 11—11 of FIG. 9.

FIG. 12 is an end elevational view of the improved hubs of the cassette, showing the hubs interconnected by a tape leader;

FIG. 13 is an enlarged, fragmentarily, exploded view of the hub and improved reel lock thereof together with a ram for inserting the reel lock into an outer peripheral recess of the hub;

FIG. 14 is an enlarged, fragmentary, end elevational view of the hub with the insert received within the recess thereof and before the end of the leader has been sheared; and FIG. 15 is a view similar to FIG. 14 but showing the end of the leader after it has been sheared.

Figure 1:
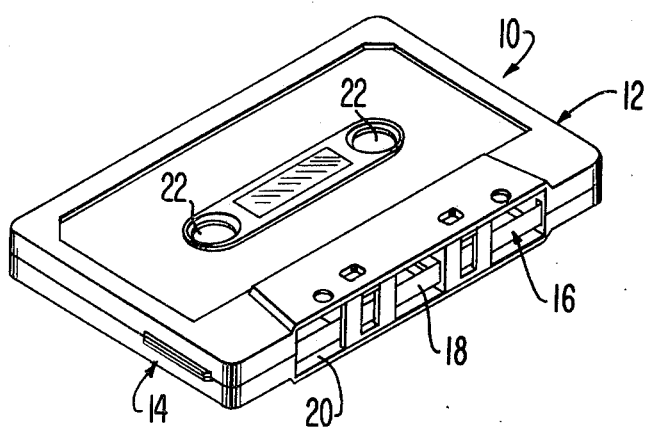
FIG. 1 is a perspective view of the tape cassette utilizing the improvements of the present invention.

The tape cassette utilizing the improvements of the present invention is broadly denoted by the numeral 10 and is a Phillips-type cassette. It has a pair of opposed shells 12 and 14 which mate to form a hollow housing which receives a pair of tape hubs (not shown) on which a flexible, magnetic tape 16 is wound. A stretch 18 of the tape extends along the front, tape-exposing open extremity 20 of cassette 12 and is adapted to move past a read-write head as the tape is driven by a capstan, the head and capstan forming parts of a tape transport (not shown). Shells 12 and 14 are provided with openings 22 which expose the inner peripheries of the tape hubs therein and allow spindles on the tape transport to be removably coupled to the tape hubs.

A first improvement for cassette 10 includes a pair of tabs 24 and 26 on the rear wall 28 of the cassette 10 for movement into and out of closing relationship with respective openings or holes 30 in the rear wall 28. Openings 30 are of the type conventionally provided in a Philips cassette when the two knock-out tabs thereof are removed. Such knock-out tabs are formed in an integral fashion to one of the two shells 12 and 14 and, when the knock-out tabs are across respective openings 30, the tabs prevent a sensing pin from entering each opening, thus keeping a recording circuit of the tape transport in an enabled condition. The tape of the cassette can, therefore, be recorded. With the knock-out tabs removed, the aforesaid sensing pin can enter each opening 30, thereby disabling the recording circuit of the tape transport so as to prevent recording on the tape. With the knock-out tabs removed, the user of the cassette will know that the tape is pre-recorded and that, without closing openings 30, it is not possible to record new material thereon. Tabs 24 and 26 of cassette 10 allow openings 30 to be selectively opened and closed, whereby the tape cannot be recorded when openings 30 are open but can be recorded when such openings are closed.

Each of the tabs 24 and 26 is pivotally mounted on rear wall 28 for movement about respective, parallel axes which are substantially normal to the major planes of shells 12 and 14. Each of the tabs includes a generally rigid, flat, thin body 32 which is pivotally mounted on a base 34 (FIG. 9), the latter having a bead 36 at the end remote from body 32. Preferably, body 32 and base 34 are of plastic material, are integral with each other, and are interconnected at a line of weakness 38.

Base 34 of each of the tabs 24 and 26 is received within a keyhole-shaped slot formed by a pair of aligned slot sections or halves in end webs integral with the respective shells 12 and 14 (FIG. 5). Shell 14 has webs 40 and 42 provided with a pair of keyhole-shaped slot sections 44 and 46, respectively. Webs 40 and 42 mate with respective webs 48 and 50 on the inner surface of shell 12. Webs 48 and 50 have keyhole-shaped slot sections 52 and 54, respectively, when shells 12 and 14 are coupled together, which mate to form the complete slots which receive respective bases 34 of the tabs. The width of each base 34 is essentially twice the depth of each of the two slot sections used to retain such base and the shape of the base, including bead 36 thereof, is complemental to each of the corresponding slots so that each base 34 and its bead 36 can be removably mounted in the corresponding slot.

Webs 40 and 42 define, with the inner surface 56 (FIG. 5) of shell 14, a pair of recesses 58 and 60 open to the rear edge 62 of shell 14. Similarly, webs 48 and 50 of shell 12 define recesses 64 and 66 which are open to the rear edge 68 of shell 12. When the shells are mated, recesses 58 and 64 define one opening 30 and recesses 60 and 66 define the second opening 30, it being clear that the rear openings of the keyhole-shaped slots are near the rear edges 62 and 68 of shells 12 and 14, respectively.

Rear wall 28 (FIG. 2) is integral with shell 12 and projects laterally from the inner surface 70 thereof (FIG. 9). Rear wall 28 has a pair of shallow recesses 72 and 74 adjacent to the inner sides of recesses 64 and 66, respectively. The depth of each of recesses 72 and 74 is approximately equal to the thickness of body 32 of a respective tab. Moreover, the shape of each of recesses 72 and 74 is substantially complemental to that of body 32 of each tab; thus, the outer, peripheral edge of the tab can be in frictional engagement with rear wall 28 at the outer, peripheral boundary of the corresponding recess 72 or 74 when the tab is in the recess, i.e., when the tab is out of closing relationship to the adjacent opening 30. As shown in FIGS. 8 and 9, tab 26 has its body 32 out of closing relationship to recess 64 and spaced from recess 72. FIGS. 8 and 9 also show tab 24 in its closed position, i.e., blocking the entrance of recess 66. A small recess extension 76 is provided for each of the recesses 72 and 74 to allow a pin or tool to be inserted beneath a body 32 in the corresponding recess to unseat the body and allow the tab to move into a position blocking the adjacent opening.

Rear wall 28 has a pair of recesses 78 and 80 which partially surround the rear openings of respective recesses 64 and 66 and recesses 78 and 80 mate with respective recesses 82 and 84 which partially surround the rear openings of respective recesses 58 and 60, the depths of recesses 78, 80, 82 and 84 being substantially equal with each other and equal to the thickness of body 32 of each of the tabs 24 and 26. The last-mentioned recesses also are complemental to outer peripheral portions of respective bodies 32 and the latter are adapted to frictionally engage rear wall 28 when the corresponding tabs are in mated recesses 78, 84, 80 and 82, respectively. In this way, the tabs can be releasably held in place when they are in either their operative positions closing openings 30 or in their standby positions out of blocking relationship to respective openings 30.

Figure 2:
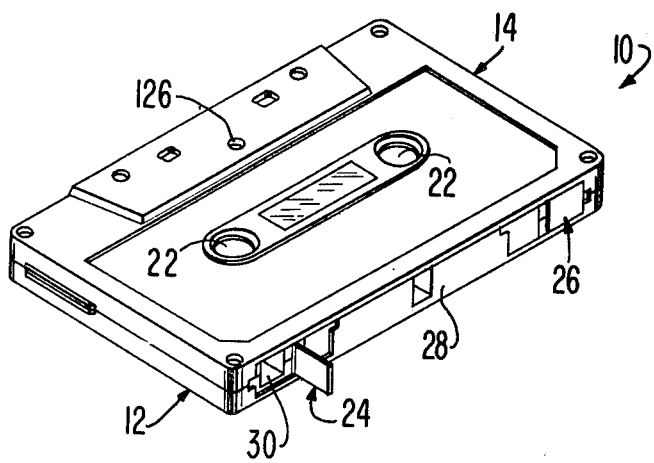
FIG. 2 is a view similar to FIG. 1 but showing the tape cassette from a different angle and illustrating the shiftable tabs which are movable into and out of closing relationship to respective openings in the rear end wall of the cassette.

Shell 14 has a pair of sides 86 and 88 which are provided with longitudinal ribs 90 and 92, respectively. Ribs 90 and 92 are adapted to be received within grooves 94 and 96, respectively, formed in the outer end faces of a pair of sides 98 and 100 integral with and forming parts of shell 12 (FIG. 9). Moreover, the outer end face of rear wall 28 has a pair of grooves 102 and 104 which mate with and receive a pair of ribs 106 and 108, respectively, formed on inner surface 56 of shell 14 when the two shells are coupled together as shown in FIGS. 1 and 2.

Shell 14 has webs 110 on its four corners, the webs projecting laterally from inner surface 56. Each web 110 has a countersuck hole 112 therein for receiving a projection 114 on a corresponding corner of shell 12, the latter having webs 116 at its four corners, webs 116 being integral with shell 12 and projecting laterally from inner surface 70 thereof. Insertion into hole 114A of self tapping assembly screws causes a diametral increase of cylindrical projection 114, thus allowing an interference fit with complemental hole 112 as formed from corresponding webs 110 so that holes 112 and projections 114 form tongue and groove structures as do ribs 90, 92, 106 and 108 and grooves 94, 96, 102 and 104. When shells 12 and 14 are brought together, the various tongues enter corresponding grooves and frictionally engage the adjacent structure so that the shells are more positively held together and are more preferably fitted together, inasmuch as the various tongues and grooves prevent any tendency for one shell to move longitudinally of the other shell.

Another feature of the cassette is the lock provided by a rear post 118 formed on the inner surface 56 of shell 14 (FIG. 7). Post 118 has a rearwardly extending projection 120 which is adapted to be received within a recess 122 in a boss 124 which is integral with and extends inwardly from rear wall 28 (FIGS. 9 and 11). Post 118 is sufficiently resilient so as to yield to one side when the shells are moved together. As soon as projection 120 is aligned with recess 122, the projection snaps into the recess and the resilience of post 118 returns it to its initial position, thereby locking the shells together at that particular location.

Shell 14 is provided with a hole 126 for receiving a screw which is threaded into an internally threaded hole 128 in a boss 130 integral with a front partition 132 near the open front extremity 20 of the cassette. Also, projections 114 are internally threaded so that screws inserted into holes 112 can be threaded into respective projections 114 to hold the shells coupled together at the corners. A screw threaded into hole 128 in boss 130 holds the front central part of the cassette together, whereas, projection 120 of post 118, when received within recess 122, holds the rear central part of the cassette together. The lock provided by post 118 is used because of the lack of structure near the rear central part of the cassette for mounting an attachment screw.

Partition 132 substantially spans the distance between the inner surfaces of shells 12 and 14. Shell 12 is provided with a front recess 134 which mates with a front recess 136 of shell 14. Partition 132 spans the length of recess 134 and is intermediate the front and rear extremities thereof. The height of partition 132 is substantially equal to the distance between the inner surfaces of those portions of shells 12 and 14 which define respective recesses 134 and 136. Shell 14 has four posts 138 at its front edge and the length of each post is substantially equal to the height of partition 132 so that the outer ends of posts 138 engage the inner surface portions 140 at the bottom of recess 134 on opposite sides of reinforcing webs 142 (FIG. 9).

Partition 132 has a pair of outer end webs 144 which are substantially horizontally aligned with each other and a pair of inclined webs 146 which span the distance between respective webs 144 and boss 130 (FIG. 9).

A pair of outer tape guides 148 project forwardly from partition 132 at the junction between respective webs 144 and 146. Similarly, a pair of tape guides 150 are integral with and project forwardly from respective webs 146 intermediate the ends of the latter. Guides 148 and 150 have front, convex, tape-engaging surfaces which are generally perpendicular the inner surface of shell 12. These convex surfaces are in generally horizontal alignment with each other and are aligned with entrance passages 152 and 154 (FIG. 9) between front webs 156 and the adjacent side webs 158, webs 158 forming side extensions for partition 132.

Since rear wall 28 and partition 132 span the distance between the effective inner surfaces of shells 12 and 14, such rear wall and partition define beams whose width are represented by the widths of the rear wall 28 and partitions 132. The widths of these beams are much greater than the effective widths of front and rear end walls of conventional Phillips-type tape cassettes so that such increeased beam width serves to prevent side bending of the cassette to avoid distorting the parts therein and to prevent errors due to mechanical misalignment of the tape.

The perpencidular tape guides 148 and 150 allow tape 16 to move past such guides without moving laterally therof or being caused to "barber pole". In conventional cassettes, tape guides similar to guides 148 and 150 are slightly inclined to allow the cassettes to be removed from molds used to form the shells of the cassette.

Figure 3:
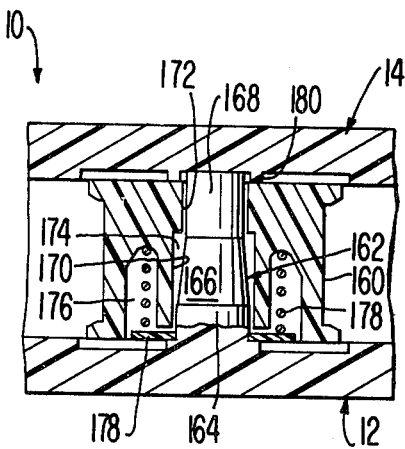
FIG. 3 is an enlarged, fragmentary, cross-sectional view of an improved idler assembly for the cassette.

Cassette 10 has a pair of idler pulleys 160 which are mounted on improved idler posts 162 of the type shown in FIG. 3. Each post 162 is integral with the inner surface of shell 12 near the front corners thereof. Each post front includes a first cylindrical portion 164, a beveled portion 166 and a second cylindrical portion 168, beveled portion 166 interconnecting portions 164 and 168 and cylindrical portion 168 being of a smaller outer diameter than that of portion 164. Such construction of the post permits it to be readily removed from a mold. Also, the outer surfaces of portions 164 and 168 define a pair of spaced bearing surfaces for the corresponding pulley 160 when the latter is provided with a first bore 170 adjacent to a second bore 172 of smaller diameter than bore 170. Moreover, when pulley 160 is mounted on post 162, a wedge-shaped space 174 is formed between portion 166 and bore 170. This space can be filled with a lubricant, if desired.

In use, the tape hubs, the tape and the idler pulley 160 are mounted in place on shell 12. Slip sheets are also generally provided between the shells and hubs to minimize friction and the build-up of static electricity. The shells are then moved together and the tongue and groove structures mentioned above provide a positive interconnection of the shells. The attachment screws are then put into place and the assembly of the cassette is complete. The cassette is then ready for use and is coupled to a tape transport to cause movement of the tape from one hub to the other past open extremity 20.

Tabs 24 and 26 can be operatively positioned as desired with respect to adjacent openings 30. The tabs are held in the corresponding recesses, whether in operative or standby positions, so that the tabs do not project laterally from rear wall 28. The positions of the tabs can be selectively changed as desired or needed.

Construction of idler posts 162 is such as to give accurate perpendicularity with respect to shell 12. Thus, idler pulleys 160 on idler posts 162 will properly orient the tape relative to the open extremity of the cassette and thereby to a read-write head adjacent to such open extremity.

Cassette 10 is also provided with a pair of tape hubs 200 (FIGS. 12–15) having improved lead-locking means thereon. To this end, each hub 200 has an outer peripheral recess extending between the end faces of the hub and including an inner, generally cylindrical recess portion 204 and an outer, generally funnel-shaped portion 206 communicating with inner portion 204 and terminating at the cylindrical outer periphery 208 of the hub. The inner and outer recess portions are formed by a pair of spaced projections 205 and 207 forming parts of the hub and extending into recess 202. The distance between projections 205 and 207 is less than the maximum transverse dimensions of inner and outer recess portions 204 and 206. Inner portion 204 is defined by a cylindrical inner surface 209 terminating at convex surfaces 210 and 212 which define the junctions between inner and outer recess portions 204 and 206. Outer portion 206 is defined by a pair of generally flat surfaces 213 which converge toward each other as inner portion 204 is approached.

A plug or insert 214 having the same thickness as hub 200 is movable into recess 202 to lock or hold a leader 216 therein in the manner shown in FIGS. 14 and 15, whereby the leader is coupled to the hub. Insert 214 has a first, generally cylindrical body 218 substantially complemental to inner recess portion 204 and a second, transversely funnel-shaped body 220 substantially complemental to an outer recess portion 206, bodies 218 and 220 being integral with each other. The cylindrical, outer surface 222 of body 218 merges smoothly with the opposed, convergent sides 224 of body 220 (FIG. 13) to present concave surfaces 226 and 228 which are complemental to surfaces 210 and 212, respectively.

The outer peripheral surface 230 of body 220 is arcuate and, when insert 214 is in its operative position (FIGS. 14 and 15), forms a substantial continuation of cylindrical outer periphery 208 of hub 200. To this end, surface 230 has a radius of curvature substantially the same as that of outer periphery 208.

Insert 214 is formed of a material which generally does not yield but is capable of being sheared. It has been found that Delrin is a material suitable for this use.

Insert 214 is adapted to be forced by a ram 232 into its operative position in recess 202. As the insert is moved into the recess, it forces one end margin of leader 216 into the recess. The leader thus extends along and firmly clamps between the surfaces defining recess 202 and the outer surfaces of insert 214. This operation is preferably performed by the use of a jig wherein the end margin of the leader is placed near the entrance to recess 212, then insert 214 is placed between the leader and the ram. When the ram is actuated, it forces the insert to move toward and into recess 202 and, in turn, forces the leader into the recess ahead of the insert. Since the insert is substantially complemental to recess 202, the portions of the hub defining surfaces 210 and 212 yield to allow body 218 of insert 214 to enter inner recess portion 204. Hub 200 is formed of a suitable yieldable material to provide for this action.

Ram 232 is provided with a transversely V-shaped knife portion 234 which is used to shear end portion 238 of leader 216 from the rest of the leader. After the insert is in its operative position and as ram 232 continues forwardly through a small distance, end portion 238 is cleanly cut, the knife portion leaving body 220 intact. Thus, when the ram completes its forward stroke, the end of the leader spaced inwardly of outer periphery 208 (FIG. 15) and outer peripheral surface 230 of body 220 will be substantially circumferentially aligned with outer periphery 208 so as to form a substantial continuation of the latter. Notches 238 and 240 (FIG. 15) at the ends of surface 230 do not impair the effectiveness of surface 230 sufficiently to cause "spoking" or other tape pack defects; thus, the tape can be wound onto the hub 200 and be adequately supported by surface 230 so as to avoid such defects.

The improved leader lock and the way in which it is coupled to hub 200 provides a quick way to attach a leader to the hub. The resulting attachment eliminates the build-up of tape markings, such as "spoking" or the like, by supporting the tape properly across the span of recess 202. Also, the geometry of insert 214 assures that the leader will be positively locked at all times. For instance, if there is a force on the leader in the direction of arrow 242 (FIG. 15), the insert 214 will tend to pivot in a counterclockwise sense about junction 212. However, this causes body 218 to press against leader 216 in the vicinity of surface 210, thereby effectively locking the leader against movement out of recess 202. In this way, the leader can be prevented from slipping away from the hub even though extremely large longitudinal forces are applied to the leader tending to pull it out of the recess.

We claim:

1. In a tape cassette: a cassette housing formed of a pair of shells with each shell having a pair of spaced opposed sides; the shells being movable into operative positions adjacent to each other with respective sides thereof in alignment with each other; and means for interconnecting the shells when the latter are in said operative positions to form said housing, there being a rib on and extending along each side, respectively, of one of the shells, each side of the other shell having a groove extending along the same and being substantially complemental to the corresponding rib of said one shell, the ribs being receivable within respective grooves when the shells are moved into said operative position, a first of said shells having a number of spaced projections thereon, the second shell having a hole for each projection, respectively, each projection being substantially complementally receivable in the respective hole when the shells are moved into said operative positions, the projections and holes being independent of the ribs and grooves.

2. In a tape cassette as set forth in claim 1, wherein a first of the shells has an end wall provided with an elongated groove therein, the second shell having a rib complementally receivable within the groove of said end wall as the shells are moved into said operative positions.

3. In a tape cassette as set forth in claim 1, wherein each shell has an inner surface, a first of the shells having a wall substantially spanning the distance between the inner surfaces of the shells and extending transversely of said sides adjacent to one extremity of the housing.

4. In a tape cassette: a cassette housing formed of a pair of adjacent, interconnected shells with each shell having a pair of spaced opposed sides, the sides of one of the shells being in alignment with and substantially abutting respective sides of the other shell, each pair of aligned, abutting sides having a rib and groove unit, the rib being on one of the sides of the pair and the groove being on the other side of the pair, the rib being substantially complementally received within the groove, a first of said shells having a number of spaced projections thereon, the second shell having a hole for each projection, respectively, each projection being substantially complementally receivable in the respective hole when the shells are moved into said operative position, the projections and holes being independent of the ribs and grooves.

5. In a tape cassette: a cassette housing formed of a pair of shells with each shell having a pair of spaced opposed sides, the shells being movable into operative positions adjacent to each other with respective sides thereof in alignment with each other; means for interconnecting the shells when the latter are in said operative positions to form said housing, there being a rib on and extending along each side, respectively, of one of the shells, each side of the other shell having a groove extending along the same and being substantially complemental to the corresponding rib of said one shell, the ribs being receivable within respective grooves when the shells are moved into said operative positions; and a releasable lock on said housing inwardly of said side, said lock including a resilient projection on a first of said shells and a boss on the second shell, said boss having a recess for removably receiving said projection.

6. In a tape cassette: a cassette housing formed of a pair of shells with each shell having a pair of spaced opposed sides, the shells being movable into operative positions adjacent to each other with respective sides thereof in alignment with each other, a first of the shells having four annular corner projections defining respective screw-receiving holes, the second shell having a screw-receiving hole therethrough for each corner projection of the first shell, respectively, each hole of the second shell being countersunk to receive the respective corner projection of the first shell; and means for interconnecting the shells when the latter are in said operative positions to form said housing, there being a rib on and extending along each side, respectively, of one of the shells, each side of the other shell having a groove extending along the same and being substantially complemental to the corresponding rib of said one shell, the ribs being receivable within respective grooves when the shells are moved into said operative positions.

7. In a tape cassette: a cassette housing formed of a pair of shells with each shell having a pair of spaced opposed sides, the shells being movable into operative positions adjacent to each other with respective sides thereof in alignment with each other, a first of the shells having four annular corner projections defining respective screw-receiving holes, the second shell having a screw-receiving hole therethrough for each corner projection of the first shell, respectively, each hole of the second shell being countersunk to receive the respective corner projection of the first shell; and means for interconnecting the shells when the latter are in said operative positions to form said housing, there being a rib on and extending along each side, respectively, of one of the shells, each side of the other shell having a groove extending along the same and being complemental to the corresponding rib of said one shell, the ribs being receivable within respective grooves when the shells are moved into said operative positions, a first of the shells having an end wall provided with an elongated groove therein, the second shell having a rib substantially complementally receivable within the groove of said end wall as the shells are moved into said operative positions.

8. In a tape cassette: a cassette housing formed of a pair of shells with each shell having a pair of spaced opposed sides, the shells being movable into operative positions adjacent to each other with respective sides thereof in alignment with each other, a first of the shells having four annular corner projections defining respective screw-receiving holes, the second shell having a screw-receiving hole therethrough for each corner projection of the first shell, respectively, each hole of the second shell being countersunk to receive the respective corner projection of the first shell; a screw for each corner projection, respectively, for interconnecting the shells when the latter are in said operative positions to form said housing, the screws extending through respective holes in the second shell and into the holes of respective corner projections, there being a rib on and extending along each side, respectively, of one of the shells, each side of the other shell having a groove extending along the same and being substantially complemental to the corresponding rib of said one shell, the ribs being receivable within respective grooves when the shells are moved into said operative positions.

9. In a tape cassette as set forth in claim 1, wherein the projections are at the corners of said first shell.

10. In a tape cassette: a cassette housing formed of a pair of adjacent, interconnected shells with each shell having a pair of spaced opposed sides, the sides of one of the shells being in alignment with and substantially abutting respective sides of the other shell, each pair of aligned, abutting sides having a rib and groove unit, the rib being on one of the sides of the pair and the groove being on the other side of the pair, each rib being substantially complementarily received within the corresponding groove, a first of said shells having a number of annular corner projections defining respective, screw-receiving holes, the second shell having a screw-receiving hole therethrough for each corner projection of the first shell, respectively, each hole of the second shell being countersunk to receive the respective corner projection of the first shell.

* * * * *